W. E. J. ANDERSON.
HAND LEVER.
APPLICATION FILED FEB. 27, 1912.
1,076,341.
Patented Oct. 21, 1913.
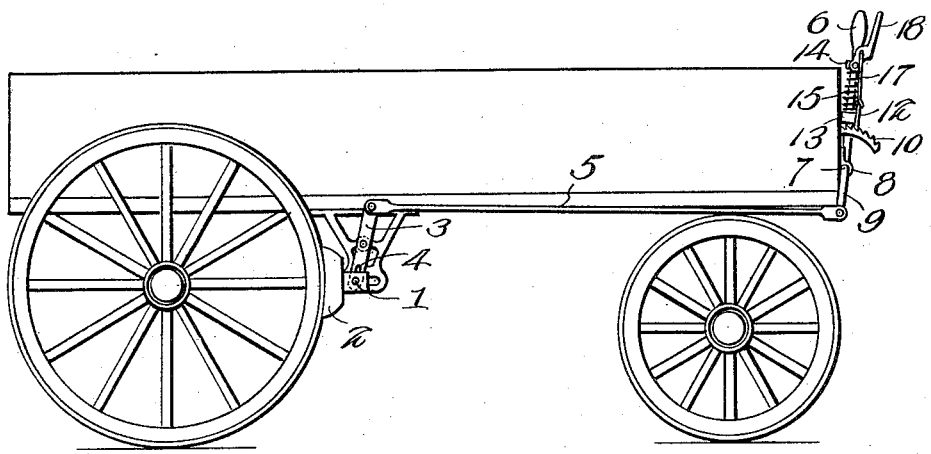
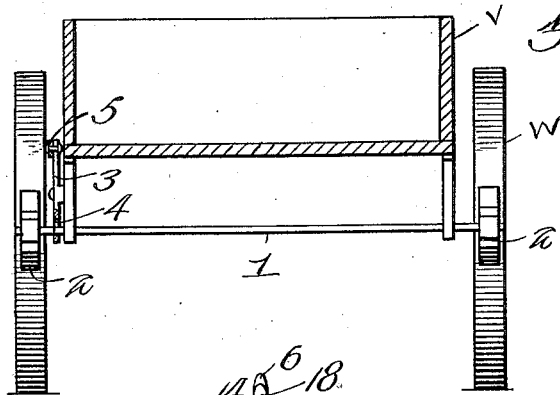
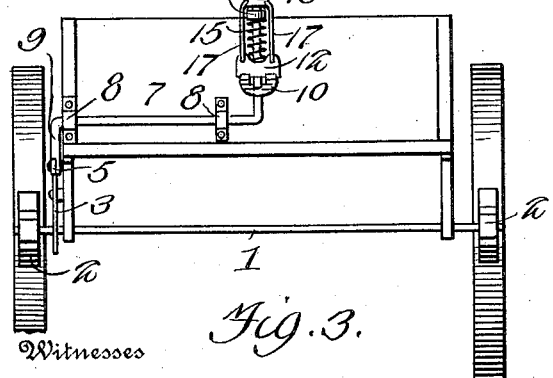
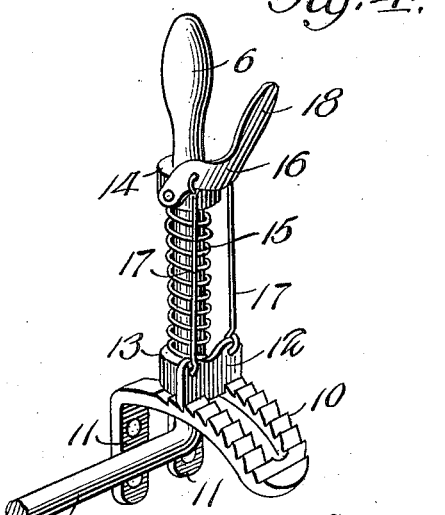
Inventor
William E. J. Anderson
By Victor J. Evans
Attorney
Witnesses
Hugh H. Htt
John J. McCarthy

UNITED STATES PATENT OFFICE.

WILLIAM E. J. ANDERSON, OF TRINIDAD, COLORADO.

HAND-LEVER.

1,076,341.　　　　Specification of Letters Patent.　　Patented Oct. 21, 1913.

Application filed February 27, 1912. Serial No. 680,283.

*To all whom it may concern:*

Be it known that I, WILLIAM E. J. ANDERSON, a citizen of the United States of America, residing at Trinidad, in the county of Las Animas and State of Colorado, have invented new and useful Improvements in Hand-Levers, of which the following is a specification.

This invention relates to improvements in brakes and has particular application to vehicle brakes.

In carrying out the present invention, it is my purpose to provide a brake wherein the brake shoes may be securely held in engagement with the vehicle wheels and disengaged therefrom when desired.

With the above-stated object in view and others of a similar nature, the invention consists in the construction, combination and arrangement of parts hereinafter set forth in and falling within the scope of the appended claim.

In the accompanying drawing forming a part of this specification; Figure 1 is a side elevation of a vehicle equipped with the present invention. Fig. 2 is a transverse sectional view of the same. Fig. 3 is a front elevation thereof, and Fig. 4 is a detail perspective view of the operating lever and segment.

Similar reference characters designate like parts throughout the several views.

Referring to the accompanying drawing in detail, V designates the body of a vehicle and W the wheels for such body, the vehicle being of any preferred or conventional design and construction.

In accordance with the present invention, a rod 1 is mounted in suitable bearings for sliding movement and arranged transversely of the body beneath the same and at a point adjacent the rear wheels. The opposite ends of the rod 1 are equipped with brake shoes 2 designed to engage the vehicle wheels in the sliding movement of the rod 1 in one direction. A lever 3 is fulcrumed intermediate its end to one side of the vehicle body and as illustrated is provided at one end with an elongated slot 4 designed to receive the rod 1, and pivotally connected to the free end of the lever 3 is an actuating rod 5 having connections with an operating lever, to be presently described, and operable to engage the shoes 2 with the wheel treads and disengage such shoes therefrom, the lever 3, in these movements of the parts sliding the rod 1 within its bearings through the medium of the slot 4. The actuating rod 5, as shown, is located to one side of the vehicle body and disposed in a horizontal plane. Arranged centrally of the vehicle body and in a plane parallel to that of the actuating rod 5, is an operating lever 6 manually operable to impart movement to the brake shoes as hereinbefore described. The operating lever 6 has formed integral therewith a right angularly extending member 7 revolubly mounted in brackets 8 secured to the front board of the vehicle body. Integral with the member 7 and extending at right angles thereto, is a connector 9 having its free end pivotally secured to the free end of the actuating rod 5 so that in the movement of the operating lever, motion may be transmitted to the actuating rod to manipulate the brakes.

In order to lock the operating lever against movement in its operative and inoperative positions, I make use of a locking mechanism including a substantially U-shaped segment 10, the opposite arms of which terminate in right angularly disposed brackets 11 adapted to receive bolts or the like fastening devices to securely hold the segment to the front board of the vehicle. The opposing limbs of the U-shaped segment, as shown, substantially inclose the lever 6 and have their upper surfaces serrated or toothed to receive a locking dog 12 carried by the operating lever whereby the latter may be securely held in an operative or inoperative position. This dog 12 is fixed upon a collar 13 surrounding the lever 6 and mounted thereon for sliding movement. At an appropriate distance above the collar 13 and fixed to the lever 6, is a stationary collar 14 and interposed between the collars 13 and 14 and embracing the lever 6 is a helical expansion spring 15 designed to exert its tension upon the collar 13 so as to normally hold the dog 12 in engagement with the segment 10 whereby accidental movement of the lever 6 from an operative or inoperative position is prevented. For the purpose of disengaging the dog from the segment 10 and moving the same against the action of the spring 15, I make use of a yoke 16 pivoted to the stationary collar 14 and connected to the dog 12. Connected to the opposing arms of the yoke 16 at a point above their pivotal connections with the collar 14, are rods 17 having their free ends secured to the dog 12 so that in the movement of the yoke in an upward direction, the dog 12 may be disengaged from the segment. A manipulating handle 18 is formed integral with the yoke 14 or connected thereto in any suitable manner to facilitate the movement of such yoke in disengaging the dog from the segment.

I claim:

A brake actuating device comprising an operating lever, a collar fixed to said lever, a second collar on said lever and slidable thereon and spaced apart from the first collar, an expansion spring encircling said lever between the collars thereon, a yoke pivoted to the fixed collar, a manipulating handle on said yoke, a substantially U-shaped segment inclosing said lever, a dog carried by the second-named collar and spanning the limbs of said segment and normally in engagement therewith, and connections between said yoke and dog whereby in the operation of the manipulating handle the dog may be disengaged from the segment against the action of said spring.

In testimony whereof I affix my signature in presence of two witnesses.

WILLIAM E. J. ANDERSON.

Witnesses:
J. A. ANDERSON,
DOROTHEA FLUKE.

---

Copies of this patent may be obtained for five cents each, by addressing the "Commissioner of Patents, Washington, D. C."